United States Patent [19]

Morinaga et al.

[11] 4,173,193
[45] Nov. 6, 1979

[54] CONTROLLING APPARATUS FOR ELECTRIC SEWING MACHINE

[75] Inventors: Shigeki Morinaga; Takeo Maeda; Tadashi Takahashi; Kosho Ishizaki, all of Hitachi, Japan

[73] Assignee: Hitachi, Ltd., Japan

[21] Appl. No.: 866,835

[22] Filed: Jan. 4, 1978

[30] Foreign Application Priority Data

Jan. 14, 1977 [JP] Japan .................................. 52-2405

[51] Int. Cl.² .................... D05B 69/26; D05B 19/00
[52] U.S. Cl. .................................... 112/275; 112/300
[58] Field of Search .................. 112/275, 277, 121.11, 112/300

[56] References Cited

U.S. PATENT DOCUMENTS

| 3,904,890 | 9/1975 | Wenrich et al. ............. 112/275 X |
| 4,014,277 | 3/1977 | Morinaga et al. .............. 112/277 |
| 4,080,914 | 3/1978 | Ishida et al. .................. 112/277 |

Primary Examiner—Peter Nerbun
Attorney, Agent, or Firm—Craig and Antonelli

[57] ABSTRACT

An apparatus for controlling an electric sewing machine has a mechanism for transmitting the driving torque of a motor to the sewing machine to drive the same, a mechanism for imparting braking power to the sewing machine to stop the same, a mechanism for stopping the needle of said sewing machine at desired positions in its stroke and controlling means adapted to control these mechanisms. At least a part of the controlling means is constituted by a microcomputer. The signal input to the microcomputer is provided in synchronization with a synchronizing clock signal, and only such input signals as required in respective periods of operation are checked in each of the periods, so that the checking of the input signals is facilitated and accidents due to erroneous operation are avoided.

7 Claims, 4 Drawing Figures

CONTROLLING APPARATUS FOR ELECTRIC SEWING MACHINE

BACKGROUND OF THE INVENTION

1. Field of the Invention

The present invention relates to an electric sewing machine and, more particularly, to a controlling apparatus of an electric sewing machine suitable for use in an industrial sewing machine having an automatic needle stopping device.

2. Description of the Prior Art

In general, industrial sewing machines are provided with automatic devices, such as trimmers for cutting threads, wipers for wiping severed threads etc, which are to be controlled in accordance with a complicated sequence.

At the same time, it is highly desirable that the sequence can readily be changed or modified and/or optionally provided with additional functions.

Further, in order to avoid accidents causing injury to the human body due to the breakage of the needle, the sequence control of the sewing machine has to be highly reliable, and should be free from malfunctions attributable to noises and other reasons.

A typical example of a controlling apparatus of the kind described is disclosed in the specification of U.S. Pat. No. 3,761,790.

Conventional apparatus of this kind usually incorporates a group of switches, such as a switch LSW adapted to be turned on when a foot pedal is depressed forward, a yarn cutting switch TSW adapted to be turned on when the foot switch is depressed backward, an upper needle stop switch USW adapted to be operated by the operator's knee, and so forth.

In order to start the sewing machine, the foot pedal is depressed forwardly, so as to turn the switch LSW on, thereby to actuate a speed controlling circuit.

The speed controlling circuit in turn provides an operation signal, through a clutch driving circuit, to the winding of the clutch to energize the same. At the same time, another operation signal is delivered to a braking winding, through a brake driving circuit, thereby to energize the same as required.

An automatic controlling circuit is provided for distributing operation signals to the clutch winding and the brake winding, for comparing the output signal from a tachogenerator adapted to detect the rotational speed of the driving shaft of the machine with a voltage signal representative of a preselected speed of the machine, thereby to operate the machine always at the preselected speed.

Also, a control circuit is provided for controlling the stopping position of the needle. To this end, the circuit is adapted to detect two positions, i.e. an upper position in which the needle assumes the uppermost position in its stroke and a lower position in which the needle assumes the lowermost position in its stroke, and, in cooperation with the state of the switches of the aforementioned switch group, to select the needle stopping position. More specifically, the lower position is selected when the switch LSW has been turned on while the upper needle stopping switch USW has been turned off, whereas the upper position is selected whenever the upper needle stopping switch USW has been turned on, even if the switch LSW has been turned on. At the same time, the upper position is selected whenever the thread cutting switch has been turned on.

Assuming here that the lower position has been selected, due to turning on and off of the switches LSW and USW, respectively, the selected position detecting signal is made valid by a positioning speed detecting signal. Then, an operation signal for braking of a certain duration is generated by, for example, a monostable multi-vibrator for stopping, when the lower position is detected, so as to apply a voltage to the brake winding through the brake driving circuit, thereby to stop the machine shaft at the lower position.

Assuming that the upper stopping switch USW is turned on during the deceleration and stopping operation of the machine, the upper position is selected as stated above to allow the machine shaft to stop with the needle at the upper position.

Once the foot pedal has been depressed backward, the thread cutting switch TSW is turned on, so as to put the speed control circuit into operation and, at the same time, to apply a voltage to the trimmer coil through the trimmer driving circuit, thereby to start the thread cutting operation. In this case, the position selecting circuit selects the upper position, so that the brake is energized for a certain period of time. At the same time, since the thread cutting switch is turned on, a driving circuit for a wiper for wiping the severed thread is actuated to apply a voltage to a wiper coil for a certain period of time, thereby to effect the wiping of the thread.

As has been explained, the controlling circuit is normally equipped with various devices such as a group of input switches including the switches LSW, TSW and so on, position detecting means and so forth.

The long wires through which these devices are connected to the controlling circuit are likely to invite external noises, often resulting in erroneous operation of the controlling circuit which may incur a serious accident, such as breakage of the needle.

In addition, when it is required to alter and modify the sequence or to add a new function to the controlling circuit, troublesome modifications are required for rearranging the wirings and circuits, since these wirings and circuits are usually fixed.

Further, an impractically large number of parts in the circuit, as well as highly complicated wirings inevitably lead to an increased cost, deterioration of reliability and malfunctions attributable to the mutual interference between the circuits.

OBJECTS OF THE INVENTION

It is therefore an object of the invention to provide a controlling apparatus for an electric sewing machine which is free from the above stated problems.

It is another object of the invention to improve the anti-noise property of the controlling circuit by adopting such an arrangement that the receipt of the input signal to the controlling circuit is performed in synchronization with a synchronizing clock signal, and that the checking of the input signal is performed only when the checking is necessitated for the desired control.

It is still another object of the invention to incorporate a computer into at least a part of the controlling circuit, so as to facilitate the checking of the input signals and, at the same time, to obtain an easier and simplified modification and addition of the function of the sequence and an improved reliability.

SUMMARY OF THE INVENTION

To these ends, according to the invention, there is provided a controlling apparatus characterized mainly by a mechanism for imparting a driving torque from a motor to the sewing machine, a mechanism for imparting a braking force to the sewing machine, a mechanism for stopping the needle of the sewing machine at predetermined positions, an automatic thread cutting mechanism for automatically cutting the thread, and controlling means adapted to control the above mentioned mechanisms, wherein the controlling means are adapted to perform a controlling function and receipt of input signals in synchronization with a synchronizing clock signal.

DETAILED DESCRIPTION OF THE PREFERRED EMBODIMENTS

Hereinafter, a preferred embodiment of the invention will be described with reference to the accompanying drawings.

Figure 1:
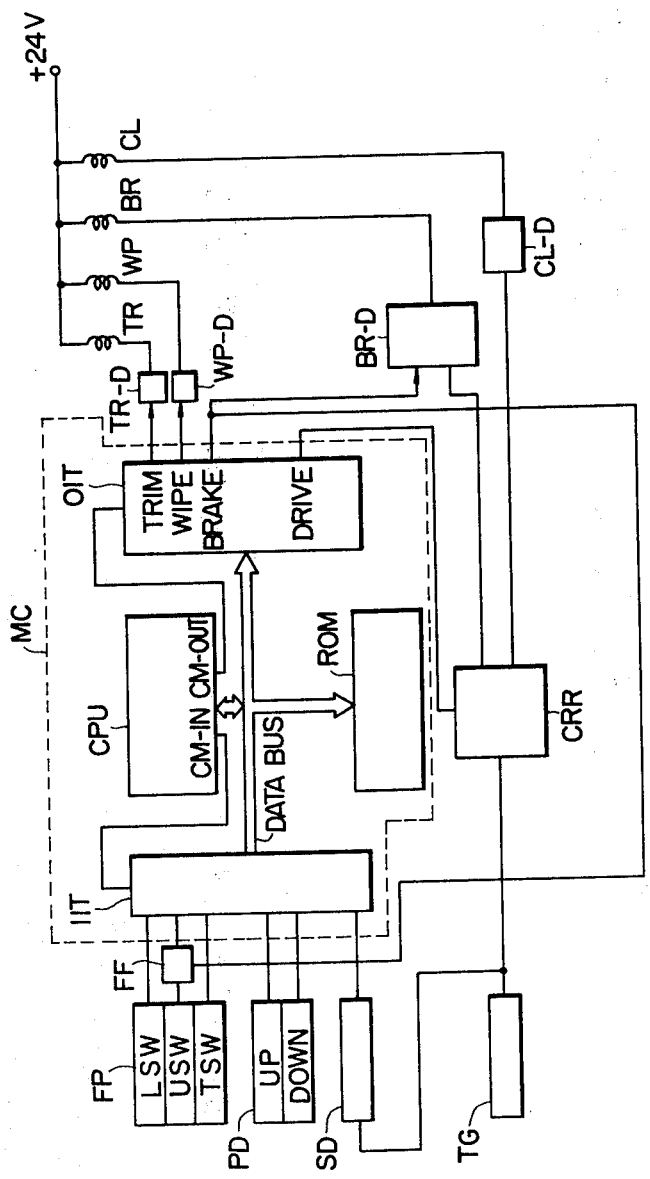
FIG. 1 is a block diagram of a controlling apparatus embodying the present invention.

Referring now to FIG. 1, a group of switches generally designated at FP and adapted to be operated by a foot pedal include a switch LSW adapted to be turned on when the foot pedal is depressed forwardly for putting the sewing machine into the state of high speed sewing, a thread cutting switch TSW adapted to be turned on by a backward depression of the foot pedal for ordering a thread-cutting operation, and an upper needle stopping switch USW adapted to stop the needle at an upper position of the machine shaft.

A position detecting circuit PD consists of an upper position detector UP adapted to generate a signal when the needle assumes the uppermost position in its stroke, and a lower position detector DOWN adapted to generate a signal when the needle assumes at the lowermost position in its stroke.

A microcomputer MC forming a part of the controlling circuit consists of a central processing unit CPU, a read-only memory ROM for storing the program which controls the microcomputer MC, an input interface circuit IIT, an output interface circuit OIT including a latch circuit, and a timer circuit (not shown) for generating clock signals. These components constituting the microcomputer MC are connected to one another through a DATA-BUS.

In the microcomputer MC, the reading of the input signal is allowed by a control signal from a controlling terminal CM-IN of the central processing unit, while the delivery of the output signal is allowed by a controlling signal from another controlling terminal CM-OUT.

The outputs from the switches LSW, USW and TSW of the switch group FP, and the outputs from the position detecting circuits PD are applied as input signals to the input interface circuit IIT. In addition, the input interface circuit IIT is adapted to receive, through a speed detecting circuit SD, an output signal from a tachogenerator TG which is adapted to detect the rotational speed of the machine shaft.

Meanwhile, the output interface circuit OIT is adapted to output an operation signal TRIM for the trimmer, an operation signal WIPE for the wiper and an operation signal BRAKE for braking. Also, a clutch driving signal DRIVE for operating the clutch circuit is delivered from the output interface OIT, through a speed controlling circuit CRR.

The trimmer operating signal TRIM delivered from the output interface OIT is applied, through a trimmer driving circuit TR-D, to a trimmer coil TR to control the same, while the wiper operating signal WIPE is used for controlling a wiper coil WP through a wiper driving circuit WP-D.

The brake operating signal BRAKE controls a brake coil BR, through a brake driving circuit BR-D, and resets a flip-flop FF which is adapted to be set by the upper needle stopping switch USW.

The output from the tachogenerator TG is supplied to the speed controlling circuit CRR which in turn is controlled by the clutch driving signal DRIVE. One of the outputs from the speed controlling circuit CRR is delivered, through the clutch driving circuit CL-D to the clutch coil CL, while the other output is delivered to the brake driving circuit BR-D.

Figure 2:
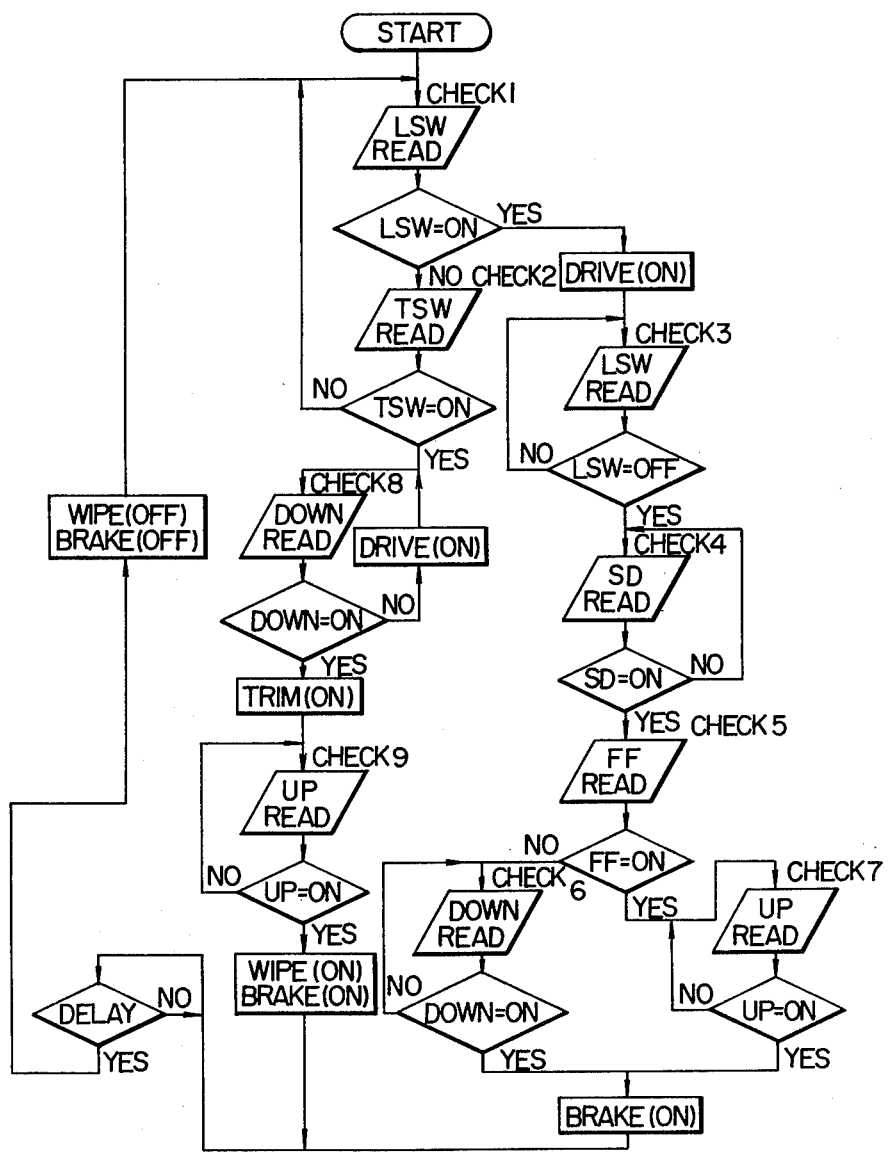
FIG. 2 is a flow chart explanatory of the controlling operation of the invention.

The operation of the apparatus in accordance with the invention will now be described with specific reference to the flow chart as shown in FIG. 2.

Assuming here that the foot pedal is in its neutral position, the state of the switch LSW is read by an operation CHECK 1. Since the LSW has not been turned ON, the operation proceeds to CHECK 2, so as to read the state of the switch TSW. Then, the operation is returned to CHECK 1, because the switch TSW is not in its ON state.

As the foot pedal is depressed forward, the switch LSW is turned ON, which is detected through the operation CHECK 1, so as to turn the signal DRIVE on, thereby to actuate the speed controlling circuit CRR. Consequently, the sewing machine is turned to its high speed sewing operation. The operation CHECK 3 is for detecting whether the foot pedal has been returned to the neutral position. The operation is returned to CHECK 3, as long as the foot pedal is kept depressed forward, because the switch LSW has not been turned off yet.

As the foot pedal is released and returned to the neutral position, the switch LSW is turned off to put the machine shaft into the braking phase. Then, the signal of the speed detecting circuit SD for the positioning is made by the operation CHECK 4. As this signal is detected, the operation proceeds to the position detecting process. The state of the flip-flop FF is determined by the operation CHECK 5, and the operation is advanced to the lower-position-stopping process when the switch USW has not been turned on. Then, the detection of the state of the lower position detector DOWN is made by the operation CHECK 6. The operation CHECK 6 is repeated when the signal DOWN has not been turned to on. However, as the signal DOWN is turned on, the process proceeds to BRAKE ON, so that a voltage is applied to the brake BR, thereby to cause the stopping of the machine shaft at the lower position. Provided that the switch USW has been turned on, the operation is advanced from CHECK 5 to CHECK 7, because the flip-flop FF is in ON state, and proceeds to the process for stopping the machine shaft at the upper position. Namely, the detection of the upper position UP is made by the operation CHECK 7. The operation CHECK 7 is repeated until the ON state of the BRAKE signal is detected. As soon as the BRAKE signal is changed to the ON state, a voltage is applied to the brake BR, thereby to stop the machine shaft at the upper position. After the working of the brake for a certain period of time, the signal BRAKE is turned off, so that the operation is returned to CHECK 1.

Assuming that the foot pedal is depressed backward from the neutral position, TSW is turned on to allow the operation to proceed from CHECK 2 to CHECK 8. As the positioning DOWN of the machine shaft, which is the requisite for the operation of the trimmer, is detected, a voltage is applied to the trimmer TR and the operation proceeds to CHECK 9. As the ON state of the signal UP representing the positioning of the machine shaft at the upper position is detected, the operation signal WIPE for the wiper WP is changed to the ON state and, at the same time, the operation signal BRAKE of the brake BR is turned on. After working for a certain period of time, these operation signals are turned off, and the operation is returned to CHECK 1.

Figure 3:
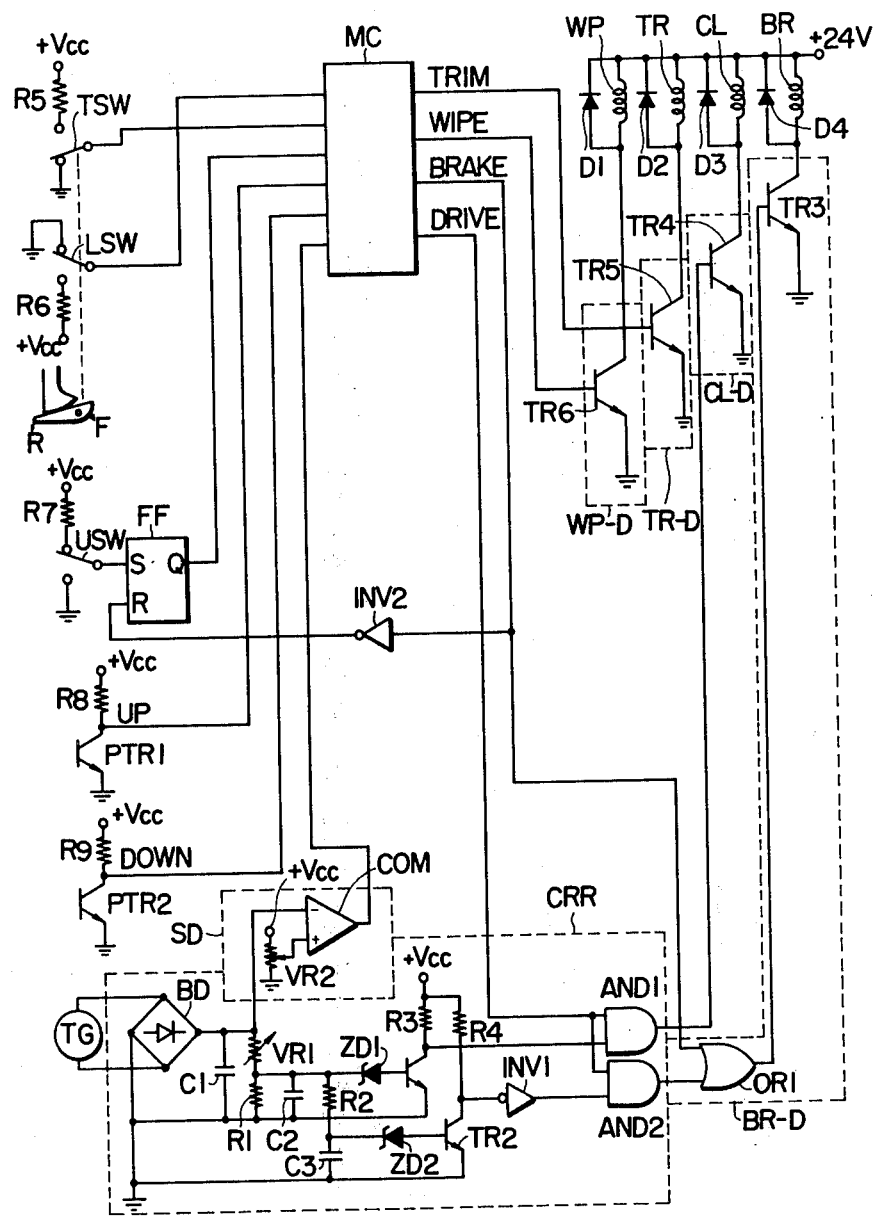
FIG. 3 is a circuit diagram of a practical example of the invention.

FIG. 3 shows in detail the circuit of the apparatus as shown in FIG. 1, in which the speed controlling circuit CRR functions as follows.

The output from the tachogenerator TG secured to the machine shaft is rectified by a full-wave rectifier bridge BD and then smoothened by means of a capacitor C1. The smoothened voltage is then divided by a resistance R1 and a variable resistance VR1 connected to the pedal, and the divided voltage representing the speed is further smoothened by a capacitor C2. A transistor TR1 is turned off, when the smoothened voltage falls below the Zener voltage of a Zener diode ZD1, so that the collector voltage of the transistor TR1, which is the input signal to an AND circuit AND1, is changed to "H"(+Vcc). On the contrary, as the smoothened first speed voltage increases to a value above the Zener voltage of the Zener diode Zd1, the transistor TR1 is turned on to change its collector potential to "L"(OV). The collector potential of the transistor TR1 is an operation ordering signal for the clutch coil CL, and is controlled by the clutch operating signal DRIVE of the microcomputer MG.

A voltage is applied to the clutch coil CL when the output from the AND gate AND1 is "H", so as to impart the driving torque to the machine, whereas no torque is imparted when the output is "L".

A second speed voltage is obtained by smoothening the output from a capacitor C2 by means of a resistor R2 and a capacitor C3. A transistor TR2 is adapted to be turned on when the second speed voltage is larger then the Zener voltage of a Zener diode ZD2. Since the collector voltage of the transistor TR2 is applied to an invertor INV1, the input to an AND gate AND2 is turned to "H".

The output signal from the invertor INV1 is the operating signal of the brake coil BR, and is under the control of the clutch operating signal DRIVE of the microcomputer. When the output from the AND gate AND2 is "H", a voltage is applied to the brake coil BR, so as to impart a braking force to the machine. On the contrary, when the output is "L", no brake force is applied to the machine.

It will be seen that the speed control is performed by alternatingly applying voltages to the clutch coil CL and to the brake coil BR.

The speed detecting circuit SD for the positioning of the needle is put into operation though a comparison of the output voltage from a variable resistor VR2 adapted to generate a standard voltage with the output voltage from the fullwave rectifier bridge BD, by means of a comparator COM. The arrangement is such that the output from the comparator COM is "H" when the machine speed is lower than a preselected speed, and, when the machine speed is higher than the preselected speed, the output from the comparator COM assumes a "L" level.

Switches LSW and TSW are adapted to be operated by the foot pedal. The switch LSW is turned to "H" when the foot pedal is depressed forward, and to "L" when the foot pedal is returned to the neutral position. The switch TSW is turned to "H" as the foot pedal is depressed backward. The upper needle stopping switch USW normally assumes the "H" level and is turned to the "L" level when operated. The flip-flop FF is set to produce an output of "H", when the output of the upper needle stopping switch USW is turned to "L" from "H".

The resetting of the flip-flop FF is made when the braking signal BRAKE from the microcomputer MC is turned on, i.e. when the signal BRAKE is turned to "H".

The position detecting circuit PD is constituted by a light-emitting diode, a phototransistor and a light-shielding plate, and is adapted to detect the position by shielding the phototransistor from the light emitted from the light-emitting diode by the light-shielding plate.

The phototransistor PTR1 is turned off when the upper position UP is detected, and the collector voltage Vp of the phototransistor PTR1 is turned to "H". The detection of the lower position DOWN by the phototransistor PTR2 is made in the same manner.

The driving circuit BR-D of the braking coil BR consists of an OR gate OR1 and a transistor TR3, and is adapted to be operated by the logical sum of the brake operating signal from the speed controlling circuit and the brake operating signal BRAKE from the microcomputer MC. That is, the driving circuit BR-D can be operated by either one of these signals.

The other driving circuits, i.e. the driving circuits WP-D, TR-D and CR-D for the wiper, trimmer and the clutch consist of, respectively, transistors TR-6, TR-5 and TR-4.

In order to change the sequence of operation in the apparatus of the present invention, the content of the memory ROM is simply changed and no specific arrangement is necessary. Also, for adding a new function, the number of the input and the output signals are simply increased to achieve the purpose.

The relationship between the operation of the machine and the inputs/outputs will be described in more detail, with specific reference to FIG. 4. The signals LSW and TSW from the foot switches, lower position signal DOWN and the upper position signal UP are the input to the microcomputer MC, while speed signal SD, drive signal DRIVE, brake signal BRAKE, thread-cutting signal TRIM and thread wiping signal WIPE are the output from the microcomputer MC.

The microcomputer MC is adapted to be operated in synchronization with a clock signal CLOCK. Namely, the checking of signals by the microcomputer is performed only when the clock signal CLOCK is at the high level (H). The microcomputer MC performs other function when the clock signal CLOCK is not at the high level "H". The alteration of output signals is made also in synchronization with the clock signal CLOCK.

At first, the switch LSW is turned on at an instant t1. However, at this moment, the signal from the switch LSW is not delivered to the central processing unit CPU, because the signal CLOCK is LOW at this moment. Then, as the signal CLOCK comes to assume the high level "H" at a moment t2, the signal of "H" level from the switch LSW is delivered to the central processing unit CPU and processed by the same to turn the drive signal DRIVE to the "H" level, so that the machine shaft is started. For stopping the machine, the foot switch is returned to the neutral position to turn the switch LSW off to put its output the "L" level at a moment t3.

However, at this moment t3, the signal of "L" level from the switch LSW is neglected, because the signal CLOCK is at the "L" level at this moment. The signal of "L" level from the switch LSW is read at a moment t4 at which the CLOCK comes to assume the "H" level, and the machine shaft is decelerated. At the moment t5 at which the speed of the machine shaft becomes lower than a preselected speed, the speed signal SD comes to assume the level "H", so that the operation proceeds to the checking of the signal DOWN of the detection of the lower position.

The machine shaft comes to assume the lower position at a moment t6. However, no operation is caused until the moment t7 at which the clock signal CLOCK comes to assume the "H" level. At the moment t7, the lower position signal is validated and picked up by the central processing unit CPU. The CPU then performs an operation and keeps the signal BRAKE at the "H" level until a moment t8, so as to decelerate and stop the machine shaft at the lower position.

Subsequently, the foot pedal is depressed to turn the switch TSW on, for effecting an automatic thread cutting, at a moment t9. However, at this moment, the clock signal CLOCK is at the "L" level, so that the output from the switch TSW is not validated. At a moment t10 at which the clock signal CLOCK is turned to the level "H", the output from the switch TSW is read by the central processing unit CPU. The central processing unit CPU then performs an operation to put the thread cutting device TR into operation. Simultaneously, the central processing unit CPU issues a driving signal DRIVE to make the machine shaft rotate at a low speed, so as to effect the thread cutting.

At a moment t11 at which the needle comes to assume its uppermost position to put the upper position signal UP to the "H" level and at which the clock signal CLOCK comes to assume the "H" level, the signal UP of the "H" level is transmitted to the central processing unit CPU. The central processing unit CPU then performs an operation to turn the driving signal DRIVE and the thread-cutting signal TRIM to the "L" level. In addition, the central processing unit CPU acts to keep the braking signal BRAKE and the thread wiping signal WIPE on, until moments t13 and t12, respectively, so that the machine shaft is stopped at the upper position and the wiping is performed to complete the operation.

It will be seen from the above description that the central processing unit will operate only to check the turning off of the switch LSW in the period between moments t1 and t4, and the signals other than the output from the switch LSW are all neglected. Similarly, the central processing unit CPU checks only the speed signal SD, in the period between t4 and t5. In the period between t5 and t7, only the lower position signal DOWN is checked. In the period between the moments t7 and t10, only the outputs from the switches LSW and TSW are checked. Similarly, in the period between t10 and t11, only the upper position signal UP is checked. No checking operation is made in the period between t11 and t12, and, from the moment t12, the central processing unit CPU turns to the checking of the output from the switch LSW.

Thus, the central processing unit CPU picks up only specific inputs in respective periods, while the signals other than those specified are not validated in respective periods. In addition, the selected input signals are validated only when the clock signal CLOCK is at the "H" level.

More specifically, in the period between the moments t2 and t4 for example, the checking operation is made only for checking the turning off of the output from the switch LSW, so that no other signals such as DOWN, UP, SD, output from the switch TSW which may be caused by erroneous operation of the same and the external noise is not picked up by the central processing unit CPU, so as to prevent the sewing machine from operating erroneously. Especially, the working of the automatic thread cutting device during the high speed operation of the sewing machine is perfectly avoided. Supposing that the switch LSW happens to invite a noise, as shown by the broken line in FIG. 4, this noise is not picked up by the central processing unit, because the clock signal CLOCK is at the "L" level during this period. It will be seen that the controlling apparatus is more free from external noises than conventional apparatus.

Concerning the period between moments t9 and t12 at which the automatic thread cutting is to occur, which operation involves the most critical problem for the safe operation of the sewing machine, only the checking of the outputs from the switches LSW and TSW is made in advance to the moment t10, and, after the switch TSW is suitably turned, only the upper position signal UP is checked in the period between t10 and t11. Thus, even when the output signal from the switch LSW is accidentally turned to "H" level, due to the an erroneous operation of the switch LSW or an external noise, such an accidental signal is never picked up by the central processing unit CPU, so that the dangerous erroneous operation to put the sewing machine into a high speed operation is completely avoided.

Figure 4:
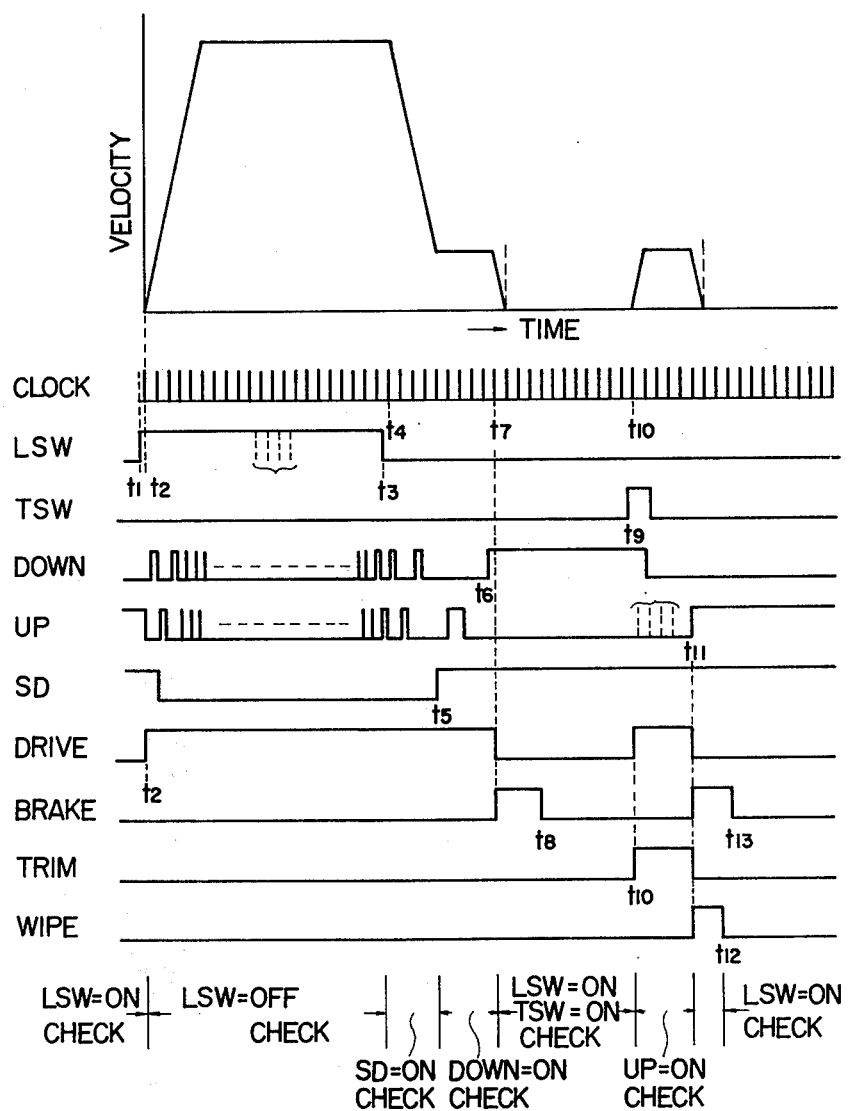
FIG. 4 is a time chart showing the operation of the apparatus of the invention.

In addition, even when a noise as shown by the broken line in FIG. 4 is invited, such a noise is never picked up by the central processing unit, because the clock signal CLOCK is at the "L" level.

Turning now to the wiping operation which involves a substantial danger of breakage of the needle, the brake signal BRAKE is kept valid during the wiping period between t11 and t12, so as to keep the sewing machine in the stopped state. In addition, since no checking of the signal is made, there is no fear of picking up external noises if any during this period. Therefore, it can never take place that the machine is accidentally started dring the wiping operation to break the needle.

As has been described, the controlling apparatus of the invention is capable of eliminating noises which may be included in the input signals, thereby to avoid the erroneous operation of the sewing machine, as well as the breaking of the needle. At the same time, accidents attributable to the erroneous operation made by the operator can fairly be avoided.

Although the invention has been described with reference to a specific embodiment making use of a microcomputer, the use of the microcomputer is not essential, and any other arrangements which can afford the reading of the signals only when a reading signal synchronized with the clock is provided and suspend the reading when the synchronized reading signal is not available.

It will be seen from the foregoing description that, since only a preselected specific signal is checked at each period of operation, the controlling apparatus of the invention prevents the sewing machine from being erroneously operated by erroneous inputs or external noises, thereby to render the operation of the sewing machine highly safe.

Especially, it is remarkable that the breakage of the needle attributable to the erroneous operation of the switches during the automatic thread-cutting operation is completely avoided, thanks to the invalidation of almost all of input signals during the thread-cutting operation.

Further, when a microcomputer is incorporated in the controlling apparatus, the number of parts which requires long lead wires is considerably reduced, and the lengths of the essential lead wires are shortened, so that the apparatus is rendered more free from the influence of external noises. At the same time, the use of the microcomputer greatly facilitates the alteration of the sequence and addition of new controlling function, and contributes to diminish the size of the apparatus, as well as to reduce the consumed power.

What is claimed is:

1. An apparatus for controlling an electric sewing machine comprising a motor, switch means providing control signals, clutch means for transmitting the driving torque of said motor to said sewing machine to drive the latter, braking means for selectively imparting a braking force to said sewing machine, means for detecting the position of the needle of said sewing machine and for generating a position signal at a desired position in its stroke, controlling means responsive to said control signals and said position signal for controlling said clutch means and said braking means to operate said sewing machine in accordance with a predetermined sequence, and clock means for controlling signal input and signal output to and from said controlling means so that such signal transfer is effected only in synchronization with a clock signal.

2. An apparatus for controlling an electric sewing machine as claimed in claim 1, further including means for enabling said controlling means, at respective periods of operation, in response only to such control signals as are required in the respective one of said periods, in synchronization with a synchronizing signal, for controlling said sewing machine in accordance with said predetermined sequence.

3. A system for controlling an electric sewing machine comprising a motor, clutch means for transmitting the driving torque of said motor to said sewing machine to drive the latter, switch means providing a plurality of input control signals, braking means responsive to a brake signal for imparting a braking force to said sewing machine, means for detecting the needle of said sewing machine at a desired position in its stroke and providing a detection output signal indicative of such position, control means responsive to such input control signals and detection output signal for controlling said clutch means and said braking means to operate said sewing machine in accordance with a predetermined sequence, including means for controlling said control means to respond during respective periods of operation of said sewing machine only to such control input signals and the detection output signal as required by said predetermined sequence, and clock means for controlling signal input and signal output to and from said control means so that such signal transfer is effected only in synchronization with a clock signal.

4. A system for controlling an electric sewing machine as claimed in claim 4, further including trimming means for trimming the thread in said sewing machine in response to said control means.

5. A system for controlling an electric sewing machine as claimed in claim 4, further including wiping means for wiping a severed thread in said sewing machine in response to said control means.

6. A system for controlling an electric sewing machine as claimed in claim 4, wherein said means for controlling said control means includes a microprocessor.

7. An apparatus for controlling an electric sewing machine comprising:
 a drive mechanism for driving said sewing machine including an electric motor, clutch means for transmitting the driving torque of said motor to said sewing machine and braking means for selectively imparting a braking force to said sewing machine;
 a thread trimmer mechanism for automatically trimming a thread;
 a thread wiper mechanism for removing thread trimmed by said thread trimmer mechanism;
 switch means providing a plurality of input control signals;
 means for detecting the position of the needle of said sewing machine; and
 control circuit means for controlling said drive, trimmer and wiper mechanisms in accordance with the detected needle position signal and said input control signals; wherein said control circuit means comprises:
 clock signal generating means for generating a clock signal at a predetermined constant period; and
 means for selectively picking up only one of the detected needle position signal and the input control signals and providing a control output signal to the corresponding one of said mechanisms in accordance with a predetermined sequence in synchronization with said clock signal.

* * * * *